Aug. 10, 1937.  G. C. PAXTON ET AL  2,089,918
SHOOK SELECTOR
Filed April 29, 1935  4 Sheets-Sheet 1
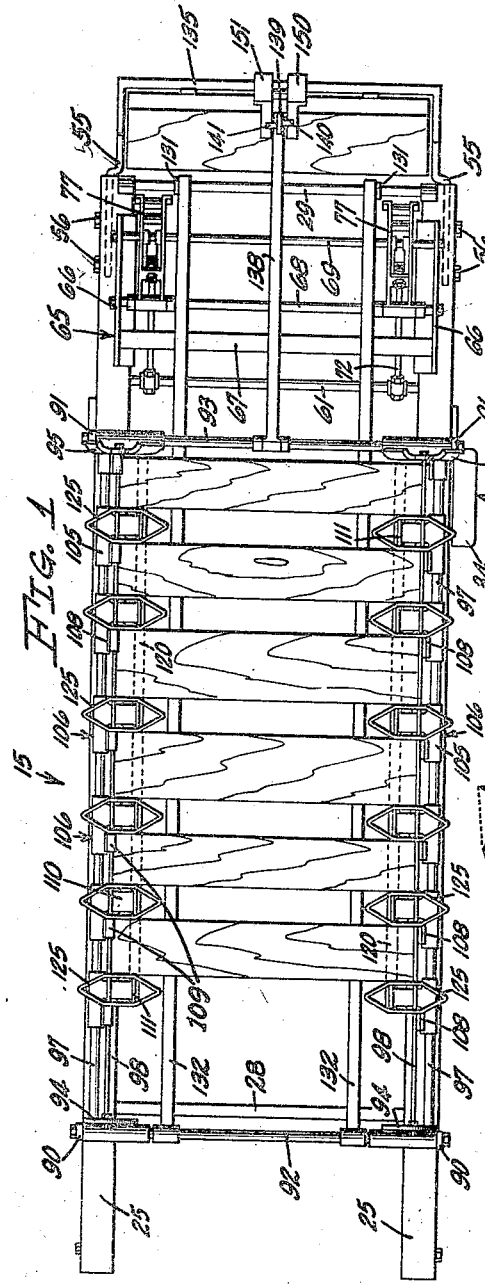
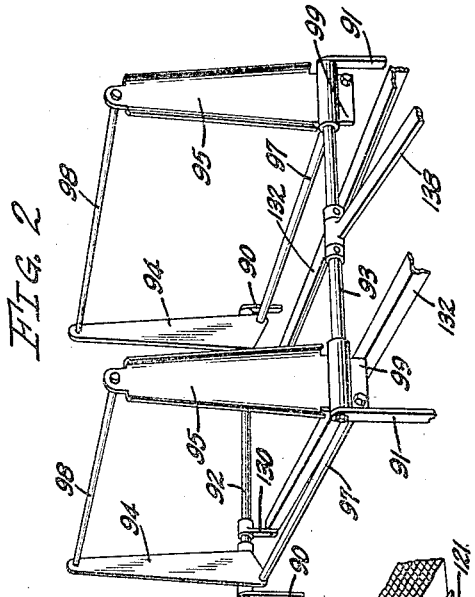
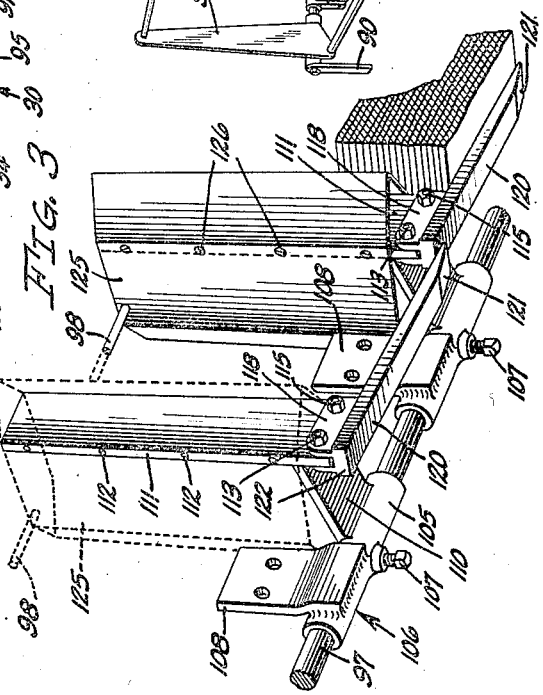
INVENTORS
GERALD C. PAXTON
CHARLES H. JOHNSON
ALBERT I. OBERMILLER
BY
ATTORNEY

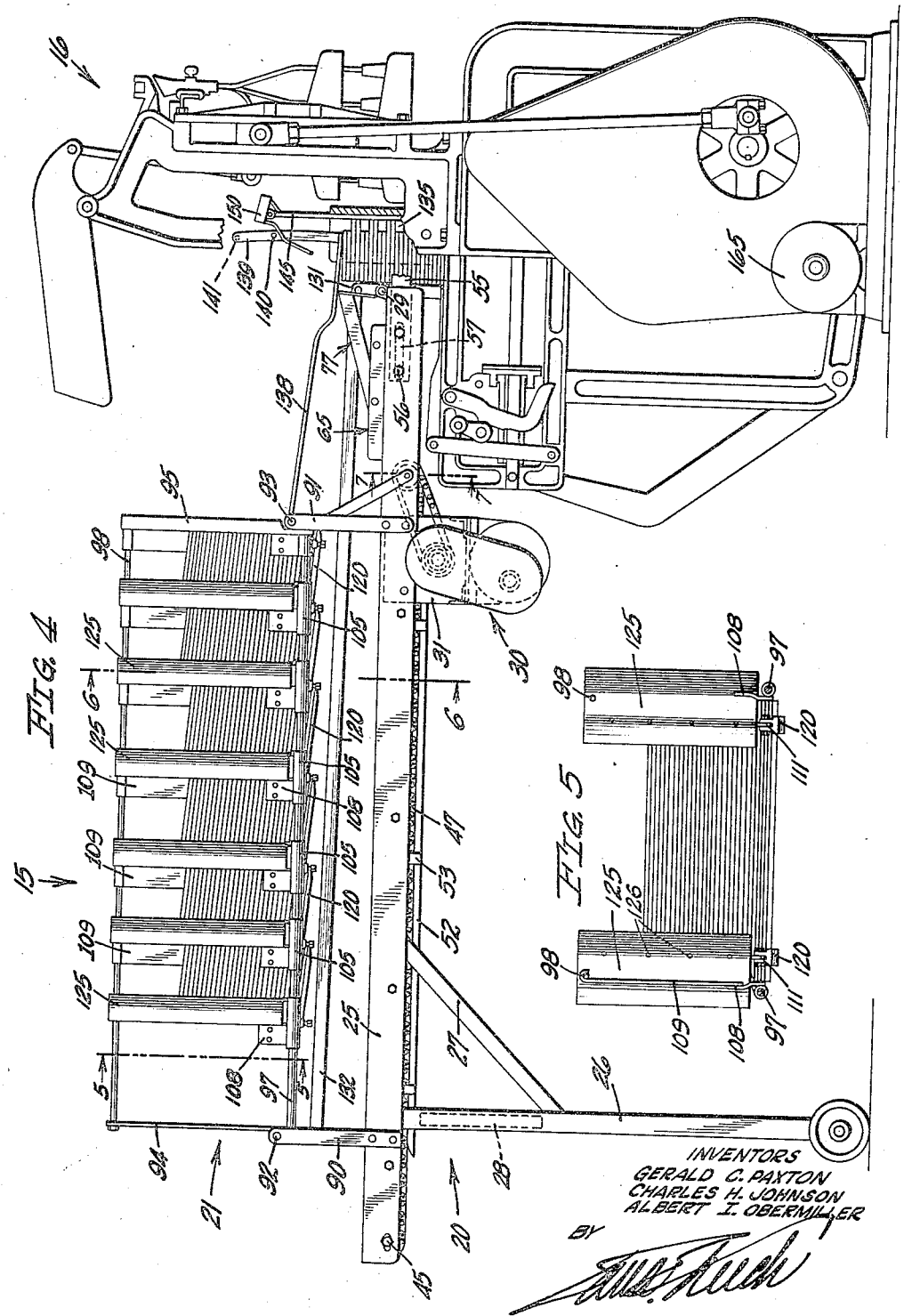

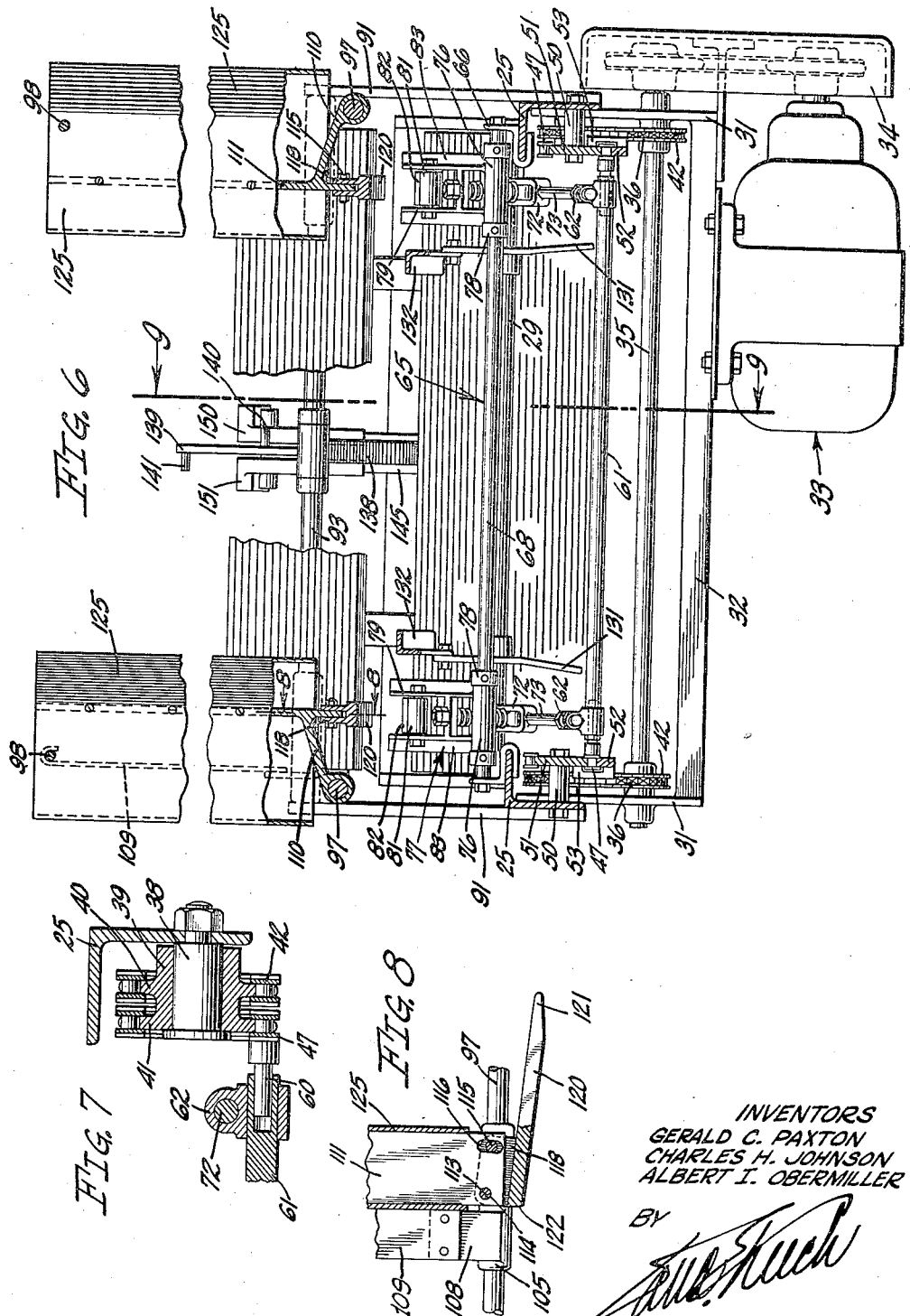

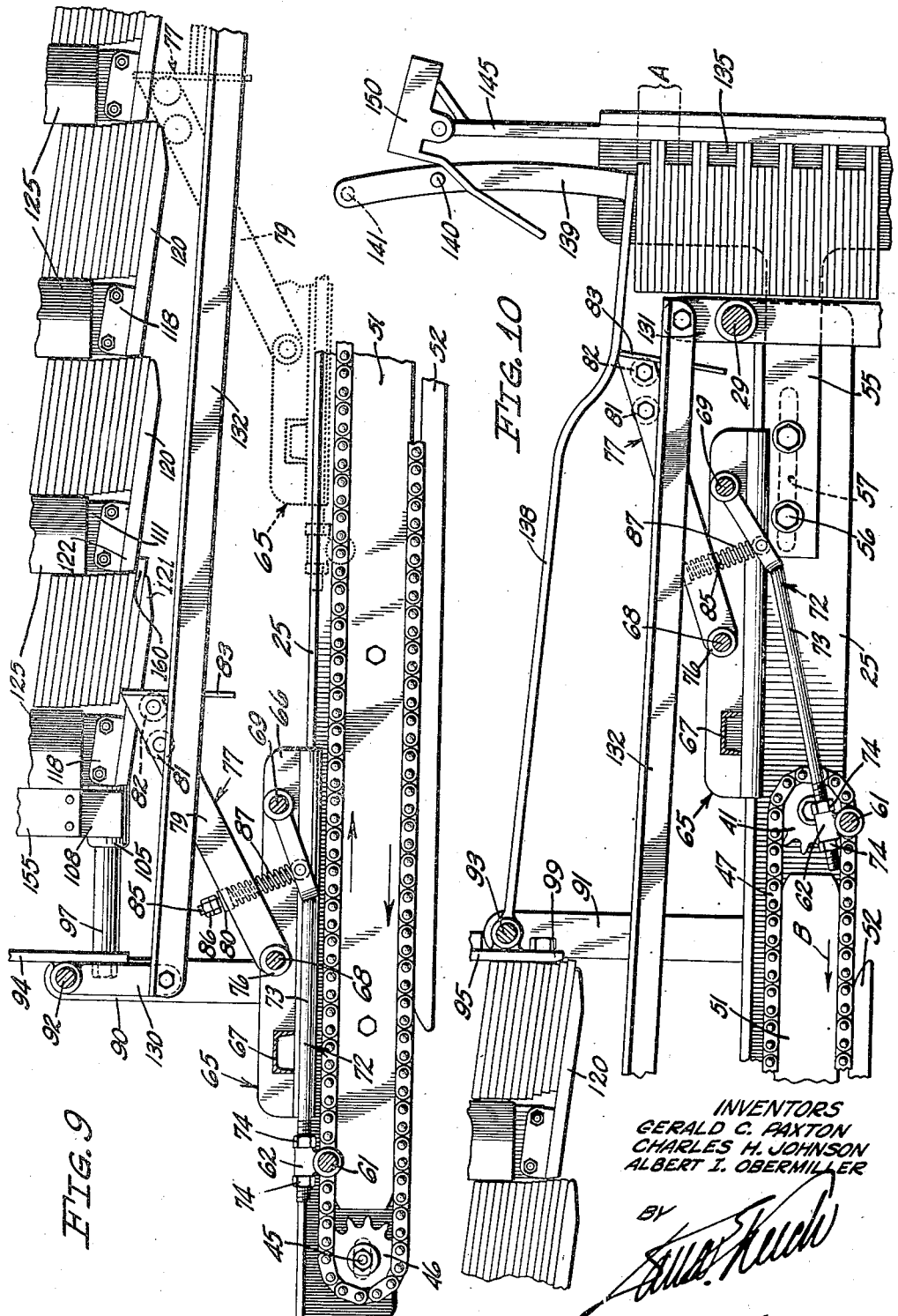

Patented Aug. 10, 1937

2,089,918

UNITED STATES PATENT OFFICE 2,089,918

SHOOK SELECTOR

Gerald C. Paxton, Charles H. Johnson, and Albert I. Obermiller, Santa Ana, Calif., assignors, by mesne assignments, to Food Machinery Corporation, a corporation of Delaware Application April 29, 1935, Serial No. 18,770

37 Claims. (Cl. 1—14)

This invention relates to machines for gathering together groups of relatively thin flat elements and has particular utility in the box making art.

Wherever large quantities of boxes are required, such as in the fresh fruit packing industry, these boxes are generally made by automatic machines from flat pieces of wood known as "shook" and which are arranged in groups in each of which groups the pieces of shook are arranged in a particular order, these groups then being deposited in a magazine, provided on the machine.

It is an object of this invention to provide a machine for gathering together in groups thin flat elements such as pieces of shook and depositing such groups successively in a magazine for receiving these.

It is a further object of the invention to provide such a machine for handling shook and which adapts its operation to that of a box making machine with which it is associated so as to keep the box making machine supplied with shook and yet not to supply more shook to this machine than the latter will make up into boxes.

Yet another object of the invention is to provide a group gathering machine as aforementioned which will automatically shut itself off or notify the operator when the supply contained therein is exhausted.

A further object of the invention is to provide such a group gathering machine which is adapted to handle and gather flat elements in a predetermined group where the various elements in each such group are of different dimensions.

A still further object is to provide such a gathering machine which is readily adjustable to gather groups which differ in that the order and/or dimensions of the elements in one group differ from those in the other group.

Other objects of the invention are to provide such a gathering machine which is economical to build; one relatively light in weight; one which is compact; one which is readily adjustable to handle different thicknesses of shook or other flat elements; one which has an accurate ejecting mechanism; one which has a quiet ejector mechanism; and/or one in which said ejector mechanism has a relatively small number of operating parts.

The means for accomplishing the foregoing objects as well as further objects of the invention will be made manifest in the folowing description taken in connection with the accompanying drawings, in which:

Fig. 1 is a plan view of a preferred embodiment of the invention.

Fig. 2 is a fragmentary perspective view illustrating certain details of the frame structure of the machine.

Fig. 3 is an enlarged fragmentary perspective detailed view illustrating the construction and mounting of the magazine-compartment-forming partitions and rests.

Fig. 4 is a side elevational view of the preferred embodiment of the invention shown associated with the automatic box making machine of the type illustrated and described in U. S. Letters Patent No. 1,844,333, issued February 9, 1932, to Elmer C. Northrup.

Fig. 5 is a detail sectional view taken on the line 5—5 of Fig. 4.

Fig. 6 is an enlarged transverse sectional view taken on the line 6—6 of Fig. 4.

Fig. 7 is an enlarged detail view taken on the line 7—7 of Fig. 4.

Fig. 8 is a fragmentary detail sectional view taken on the line 8—8 of Fig. 6.

Figs. 9 and 10 are enlarged detail longitudinal sectional views taken on the line 9—9 of Fig. 6.

Referring specifically to the drawings, the preferred embodiment of the invention is designated by the numeral 15 and is shown associated with a box making machine 16 (see Fig. 4) of the type hereinbefore mentioned.

The machine 15 includes a base frame and power mechanism unit 20 and a magazine unit 21. The unit 20 includes longitudinal angle iron frame members 25 having wheeled legs 26 secured thereto, these legs being braced to the angle iron members 25 by braces 27 and being held in rigid spaced relation by transverse bracing 28 (see Fig. 4). At their opposite ends, the angle iron members 25 are held in spaced relation by a transverse bar 29. Rigidly secured to the vertical flanges of the frame members 25 is a power unit 30 including plates 31 which are bolted to the members 25 and have cross bars 32 (see Fig. 6) on which a motor 33 and a chain transmission 34 are mounted.

Journalled in suitable bearings provided on the plates 31, is a shaft 35 having sprockets 36, this shaft being connected by the chain transmission 34 with the motor 33. Rotatable on stub shafts 38 provided on the angle iron members 25 are double sprockets 39, each of which includes individual sprockets 40 and 41. The sprockets 36 are connected by chains 42 with the sprockets 40. Adjustably mounted on the angle iron frame members 25 at their rearmost extremities are stub shafts 45 rotatably carrying sprockets 46. The sprockets 46 are in radial alignment with the sprockets 41 and endless chains 47 are trained about these sprockets. Supported on the angle iron members 25 by spacers 50 are rails 51 which support the upper flights of the chains 47, the lower flights thereof being supported on rails 52, the latter being suspended from the rails 51 by blocks 53.

The ends of the frame members 25 adjacent the connecting bar 29 are supported on arms 55 provided on the machine 16 (see Figs. 4 and 10), this being accomplished by bolts 56 passing through slots 57 in the members 25.

Provided on corresponding opposite links of the chains 47 is a pair of pins 60 on which is pivotally mounted a shaft 61, this shaft having sleeves 62 rigidly fixed thereon.

Slidably mounted on the horizontal flanges of the angle iron members 25 (see Figs. 6 and 10) is an ejector carriage 65 including slide runners 66 and a bar 67 and shafts 68 and 69 connecting said runners. Forks 72 have their bifurcated ends pivoted on the shaft 69. Stems 73 of these forks extend through the collars 62 on the shaft 61 and are adjustably secured therein by nuts 74.

Pivotally mounted on shafts 68 are bearing sleeves 76 on ejectors 77. Each of these ejectors is positioned laterally by collars 78 on the shaft 68 and has arms 79 which are connected by a bridge 80 and rotatably support rollers 81 and 82 between their forward ends. Each of the arms 79 is provided at its forward end with an ejector face plate 83 (see Figs. 9 and 10).

Pivotally mounted within each of the forks 72 is the head of a threaded pin 85 (see Figs. 6 and 9), this pin extending upwardly through an aperture in the bridge 80 of the ejector 77 disposed immediately thereabove and having lock nuts 86 on its upper end. Coiled about each of the pins 85 between its head and the bridge 80 through which it extends is an expansion spring 87 which tends to yieldably support the ejector 77 engaged thereby in its upwardmost position in which the bridge 80 contacts the nuts 86.

The magazine unit 21 is supported on legs 90 and 91 which are fixed on the angle iron members 25 and extend upwardly therefrom to be connected at their upper ends by shafts 92 and 93, respectively. Fixed on the shafts 92 and 93 are upright members 94 and 95, these members being connected by and supporting shafts 97 at their lower ends and rods 98 at their upper ends. As seen in Fig. 2, the shafts 97 and rods 98 extend along opposite sides of the machine. Each of the uprights 95 has a shook stop shoulder 99, the purpose of which will be manifest hereinafter.

Slidably receiving the shafts 97 are mounting sleeves 105 of a series of partition supporting brackets 106. Each of these sleeves has a set screw 107 for fixing its position on the shaft 97 which supports it. Each bracket 106 (see Fig. 3) includes a stop support lug 108 which is fixed thereto and extends slightly outwardly and upwardly therefrom and is apertured for receiving screws to fix a stop plate 109 thereon when it is desired to do so. The sleeve 105 of each bracket also has an arm 110 which extends inwardly and slightly upwardly therefrom, this terminating in a partition standard 111 having threaded holes 112 provided therein. The standard 111 extends a slight distance below the point of its juncture with the arm 110 to receive a bolt 113 through a hole 114 and a bolt 115 through a slot 116 (see Figs. 3 and 8). The bolts 113 and 115 extend through lips 118 which extend upwardly from one end of a magazine rest 120, the lower end 121 of which is slightly beveled from beneath. The butt end 122 of the rest 120 has a shook engaging surface which is disposed substantially vertically as shown in Fig. 8. It is clear that by loosening the bolt 115, each rest 120 may be rocked about the bolt 113 within the limits of the slot 116 to alter the vertical position of the forward end 121 of the rest member 120. It is also clear that the butt end 122 of the rest 120 suffers practically no change in its vertical position during this rocking.

Placed over each of the partition standards 111 is a hollow sheet metal partition 125 (see Fig. 3), which is secured to that standard by flat headed screws 126 extending through the partition and into the threaded holes 112. As clearly seen in this view and in Fig. 1, the partitions 125 are wedge shaped at their opposite ends. Each of the partitions 125 is also apertured to slidably receive that rod 98 which is disposed on the same side of the machine.

As shown in Figs. 1, 3, 6 and 9, each adjacent pair of partitions 125 and the rests 120 which project into the space between these partitions cooperate to form magazine compartments for shook, or other similar flat elements. Where the machine is used for gathering shook, the necessary width of each of these magazine compartments is procured by adjusting the brackets 106 longitudinally on the shaft 97. These compartments, of course, must be of suitable size to accommodate the differently dimensioned pieces of shook which go together to make up the groups into which all the shook is to be divided. For instance, the preferred embodiment illustrated herein is adjusted to form successive groups of shook like the group indicated by the letter "A" in Fig. 10. Each of these groups comprises: two relatively narrow pieces of shook, two relatively wide pieces of shook, and then two relatively narrow pieces of shook again. The six compartments provided in the machine 15, therefore, are adjusted to receive large supplies of pieces of shook of these six kinds in the order these appear in group "A", that is, the first two compartments will be adjusted to receive narrow shook, the next two wide shook, and the last two the narrow shook. As shown in Fig. 9, the rest members 120 are of different lengths, this length differing in accordance with the width of shook to be received by the magazine compartments disposed over these particular rests 120. This is not essential, however, as the rest members 120 may extend quite a distance under the next rest member 120 disposed in advance thereof in order to effect the formation of a magazine compartment of desired width thereabove.

It is to be noted in Fig. 9 that the butt end 122 of each rest 120 forms a gauge member which cooperates with the forward tip of the rest 120 disposed immediately rearward thereof to provide a discharge opening of regulated size, this regulation being effected by the setting of the last mentioned rest 120 higher or lower by loosening the bolt 115 thereof and then tightening this after adjusting the rest. This adjustment is necessary wherever there is a change in the thickness of the shook to be handled.

It is to be noted that the rests 120 are disposed directly over and in alignment with the rollers 81 and 82 of the ejector 77. Supported on the ends of arms 130 extending downwardly from the shaft 92, and arms 131 extending upwardly from the bar 129, is a pair of angle iron tracks 132 which terminate at a gathering magazine 135 provided on the automatic box making machine 16. Pivotally mounted on shaft 93 and extending forwardly therefrom is an arm 138, the forward end of which is adapted to rest upon shook in the magazine 135, there being a sector member 139 extending upwardly from the forward extremity of the arm 138. Provided on the member 139 are laterally extending lugs 140 and 141. Pivotally supported upon the frame member 145 of the machine 16 which comprises the forward wall of the gathering magazine 135 are mercury rocker switches 150 and 151.

The machine 15 is adapted to be charged with shook from either side thereof, whichever is most convenient in the particular situation in which the machine is placed. When a given side of the machine is chosen for charging the machine, the lugs 108 at the opposite end of each of the magazine compartments of the machine is provided with one of the stop plates 109, the latter having a hook bent on its upper end which extends around the rod 98 on that side of the machine. When, for any reason, it is desired to change the procedure and charge the machine 15 from the other side, it is merely necessary to remove the stop plates 109 and transfer these to the other side of the machine.

Operation

The first step of the operation is to charge the machine 15 with shook with the proper face in each instance disposed upwardly and in proper end to end relation. This becomes of particular importance where certain of the pieces of shook may be printed and the particular disposition of the printed face as the case may require is essential for the proper appearance of the printing on the box when this is made up in the machine 16. Exercising care in this respect, therefore, each of the compartments of the machine 15 is charged with shook as these are shown in Fig. 4.

The electric circuit of the motor 33 is now energized, this circuit including the switch 150 and being opened when the switch 150 is positioned as shown in Figs. 4 and 10. In these views, however, the magazine 135 is shown filled with shook, in which event the motor 33 will remain dead until by operation of the machine 16, the shook in the magazine 135 is used up in the manufacture of boxes until the downswinging of the arm 138 brings the pin 140 into engagement with the rocker switch 150, rocking this to close the circuit of the motor 33 and causing this to be energized. This sets in motion the chain speed reduction mechanism 34 and rotates the sprockets 39, causing the chains 47 to travel about their endless paths.

Assuming the slide carriage 65 to be positioned as shown in Fig. 10 at the time the motor 33 is energized, the chains 47 start moving in the direction of the arrow B in this view, thus drawing the ejector carriage 65 rearwardly in depressed position through the machine 15 until the bar 61 passes upwardly around the sprockets 46. This swings the forked arms 72 upwardly and through the springs 87 swings the ejectors 77 upwardly into approximately the positions in which these are shown in Fig. 9. As the bar 61 starts forwardly through the machine, the ejector rollers 82, because of the elevated positions of the ejectors, contact with the lower surfaces of the rests 120 underlying the first shook magazine compartment and the contact of these rollers with these rests determines the distances which the face plates 83 extend above these rests.

It is of importance that this distance be uniform at all times as the face plates 83 must extend far enough to be sure to engage the lowermost piece of shook resting upon these particular rests 120 and must not extend so great a distance above the rests as to engage two pieces of shook. Fig. 9 illustrates the forward movement of the ejector 77 just after the face plates 83 have engaged the lowermost piece of shook in the first of the magazine compartments of the machine. As shown in this view, this engagement ejects the lowermost piece of shook from the lower end of this compartment through a discharge opening 160 formed between the forward end 121 of the rest 120 of that compartment and the butt end 122 of the rest 120 of the second magazine compartment.

As this lowermost piece of shook is ejected from the bottom of the first magazine compartment, it falls upon the rail 132 and is impelled therealong by the continued forward movement of the face plates 83 on the ejectors 77. As the rollers 82 roll off the forward beveled ends of the first pair of rests 120, the rollers 81 come into contact with these same forward ends 121 causing a smooth movement of the ejector 77 until the rollers 82 engage the next rest 120. Continuing forwardly, the ejectors 77 eject the lowermost piece of shook from the bottom of each of the magazine compartments in the machine, each piece of shook ejected falling on top of the piece last previously ejected during this particular trip of the ejectors until, when the ejectors arrive at the forward end of the machine, they have collected or gathered a new group "A" of shook ready for delivery to the magazine 135. As before stated, Figs. 4 and 10 show the magazine 135 filled so as to lift the arm 138 and cut out the switch 150 thereby stopping the motor 33. This is necessary, as when the magazine 135 is filled to the extent shown, no more shook can be fed thereto by the ejectors 77 until the upper level of the shook in this magazine falls below the top of the tracks 132.

The rocker switch 151 is placed in the circuit of the motor 165 of the automatic box making machine 16 so that when the machine 15 fails to deliver shook to the magazine 135 fast enough to prevent the arm 138 dropping down to a point where the pin 141 engages the rocker switch 151, the latter switch is actuated to open the circuit of the motor 135 and stop the operation of the machine 16. This automatic control is for the purpose of warning the operator of the exhaustion of the shook in the individual magazine compartments of the machine 15. Normally, the exactly same amount of shook is placed in each of these compartments in charging this machine so that these compartments will all be exhausted simultaneously. If desired, the switch 151 may close the circuit of a bell when engaged by pin 141 to effect the warning of the operator.

It is to be noted that the last of the magazine compartments is formed between the final pair of partitions 125 and the frame uprights 95. The stop shoulders 99 on said uprights (see Fig. 2) cooperate with the rests 120 under that compartment to provide discharge openings for the shook ejected from that compartment.

In order to adjust the magazine section 21 to shook varying in length, the members 94 and 95 are adjustable laterally on the shafts 92 and 93, and the arms 130 and 131 supporting the tracks 132 are adjustable laterally on the shafts 92 and 29. All of the elements so adjustable are provided with suitable means (not shown) for temporarily fixing them in suitable adjusted positions on the shafts 92, 93 and 29.

What we claim is:

1. In a machine for gathering groups of flat elements the combination of: magazines for receiving a plurality of different kinds of flat elements to be fed; rest means for each magazine against which the next element to be discharged from said magazine rests, there being a discharge opening for each magazine adjacent said means; and ejector means operating successively to eject an element from each of said magazines, said ejector means being guided during said ejections by said rest means from beneath to determine the depth of bite taken by said ejector means.

2. In a machine for gathering groups of flat elements the combination of: magazines for receiving a plurality of different kinds of flat elements to be fed; rest means for each magazine against which the next element to be discharged from said magazine rests, there being a discharge opening for each magazine adjacent said means; and ejector means operating successively to eject an element from each of said magazines, said ejector means being guided during said ejections by said rest means, said rest means for each pair of adjacent magazines cooperating to provide the aforesaid discharge opening for the rearmost of said pair of magazines.

3. In a machine for gathering groups of flat elements the combination of: magazines for receiving a plurality of different kinds of flat elements to be fed; rest means for each magazine against which the next element to be discharged from said magazine rests, there being a discharge opening for each magazine adjacent said means; ejector means operating successively to eject an element from each of said magazines, said ejector means being guided during said ejections by said rest means; and means for adjusting said rest means for each magazine to vary the size of said discharge opening for said magazine.

4. In a machine for gathering groups of flat elements the combination of: magazines for receiving a plurality of different kinds of flat elements to be fed; rest means for each magazine against which the next element to be discharged from said magazine rests, there being a discharge opening for each magazine adjacent said means; ejector means operating successively to eject an element from each of said magazines, said ejector means being guided during said ejections by said rest means, said rest means for each pair of adjacent magazines cooperating to provide the aforesaid discharge opening for the rearmost of said pair of magazines; and means for adjusting said rest means for each magazine to vary the size of said discharge opening for said magazine.

5. A combination as in claim 1 in which said rest means constitutes a support for said elements in said magazines; and means for yieldably pressing said ejector means upwardly against said rest means.

6. A combination as in claim 2 in which said rest means constitutes a support for said elements in said magazines; and means for yieldably pressing said ejector means upwardly against said rest means.

7. A combination as in claim 3 in which said rest means constitutes a support for said elements in said magazines; and means for yieldably pressing said ejector means upwardly against said rest means.

8. A combination as in claim 4 in which said rest means constitutes a support for said elements in said magazines; and means for yieldably pressing said ejector means upwardly against said rest means.

9. In a machine for gathering groups of flat elements, the combination of: a plurality of magazine partition members mounted in shiftable relation to each other to form magazine compartments between adjacent partition members and permit adjustment of the dimensions of said compartments by shifting said partition members, opposite faces of each partition member, excepting the endmost, forming boundaries for two adjacent compartments; and means for gathering elements from said compartments and assembling these in predetermined order.

10. In a machine for gathering groups of flat elements, the combination of: a plurality of magazine partition members mounted in shiftable relation to each other to form magazine compartments between adjacent partition members and permit adjustment of the dimensions of said compartments by shifting said partition members, opposite faces of each partition member, excepting the endmost, forming boundaries for two adjacent compartments, said partitions being disposed at opposite end portions of said compartments and in spaced relation laterally of said machine; and means for gathering elements from said compartments and assembling these in predetermined order.

11. In a machine for gathering groups of flat elements, the combination of: a plurality of magazine partition members mounted in shiftable relation to each other to form magazine compartments between adjacent partition members and permit adjustment of the dimensions of said compartments by shifting said partition members, opposite faces of each partition member, excepting the endmost, forming boundaries for two adjacent compartments, said partitions being disposed at opposite end portions of said compartments in laterally spaced rows of members; a pair of shafts one of which is disposed adjacent each of said rows; means for slidably mounting each of the members in each of said rows on the shaft adjacent said row; and means for gathering elements from said compartments and assembling these in predetermined order.

12. In a machine for gathering groups of flat elements, the combination of: a plurality of magazine partition members mounted in shiftable relation to each other to form magazine compartments between adjacent partition members and permit adjustment of the dimensions of said compartments by shifting said partition members, opposite faces of each partition member, excepting the endmost, forming boundaries for two adjacent compartments, said partitions being disposed at opposite end portions of said compartments in laterally opposed rows of members; two shafts disposed longitudinally of said machine along the opposite ends of said compartments the partition members in each of said rows being slidably supported upon one of said shafts; and means permitting relative movement between said shafts to alter the length of said compartments.

13. In a machine for gathering together certain groups of flat elements, the combination of: means forming a plurality of magazine compartments each compartment being adapted to receive said elements at either end of said compartment; means readily transferable from one end of each compartment to the other end thereof to form a back stop for the end not being used to receive said elements; and means for gathering elements from said compartments and assembling these in predetermined groups.

14. In a machine for gathering together certain groups of flat elements, the combination of: a pair of shafts along opposite sides of said machine; a plurality of brackets carried by said shafts and adjustable lengthwise thereon; partitions provided on said brackets, said partitions cooperating to form magazine compartments; rest means provided on said brackets for supporting elements placed in said compartments, there being discharge openings provided permitting the removal from said compartments of the elements resting directly against said rests; and means for accomplishing said removal to gather elements from said compartments and assemble these in predetermined order.

15. In a machine for gathering together certain groups of flat elements, the combination of: a pair of shafts along opposite sides of said machine; a plurality of brackets carried by said shafts and adjustable lengthwise thereon; partitions provided on said brackets, said partitions cooperating to form magazine compartments; rest means provided on said brackets for supporting elements placed in said compartments; gauge means provided on said brackets in advance of each such compartment and cooperating with the rest means which supports elements within said compartment to form discharge openings for such compartments said openings permitting the removal from said compartments of the elements resting directly against said rests; and means for accomplishing said removal to gather elements from said compartments and assemble these in predetermined order.

16. In a machine for gathering together certain groups of flat elements, the combination of: a pair of shafts along opposite sides of said machine; a plurality of brackets carried by said shafts and adjustable lengthwise thereon; partitions provided on said brackets, said partitions cooperating to form magazine compartments; rest means provided on said brackets for supporting elements placed in said compartments; gauge means provided on said brackets in advance of each such compartment and cooperating with the rest means which supports elements within said compartment to form discharge openings for such compartments said openings permitting the removal from said compartments of the elements resting directly against said rests; means for adjusting the size of said openings by modifying the spacing of said gauge means and said rest means; and means for accomplishing said removal to gather elements from said compartments and assemble these in predetermined order.

17. A combination as in claim 9, in which supports are provided on said partition members for supporting the elements placed in said magazine compartments, and permitting the discharge from each such compartment of the lowermost element disposed therein.

18. A combination as in claim 9, in which support means is provided on each of said partition members having a magazine compartment in advance thereof for supporting the elements placed in said compartment, and permitting the discharge from said compartment of the lowermost element disposed therein.

19. A combination as in claim 9, in which support means is provided on each of said partition members having a magazine compartment in advance thereof for supporting the elements placed in said compartment, and permitting the discharge from said compartment of the lowermost element disposed therein, there being gauge means provided on each partition member disposed in advance of a magazine compartment said gauge means cooperating with said support means to permit the discharge from said compartment of a lowermost one of the elements resting therein.

20. A combination as in claim 9, in which support means is provided on each of said partition members having a magazine compartment in advance thereof for supporting the elements placed in said compartment, and permitting the discharge from said compartment of the lowermost element disposed therein, there being gauge means provided on each partition member disposed in advance of a magazine compartment, said gauge means cooperating with said support means to permit the discharge from said compartment of only the lowermost of the elements resting therein, means also being provided to change the spacing between said support means and said gauge means controlling the discharge of elements from said compartments to accommodate elements varying in thickness.

21. In a machine for gathering groups of flat elements, the combination of: two rows of magazine partition members the members in each row being mounted together as a unit in upright spaced relation with each other and said rows being spaced laterally from each other to form magazine compartments between adjacent partition members, opposite faces of each pair of corresponding partition members in said rows, excepting the endmost pairs, forming boundaries for two adjacent compartments; supports provided on said partition members at the lower ends of said compartments to support elements placed in said compartments and permit the discharge from each compartment of the lowermost of said elements resting therein; and means for gathering elements from lower ends of said compartments and assembling these in predetermined order.

22. In a machine for gathering groups of flat elements, the combination of: two rows of magazine partition members the members in each row being mounted together as a unit in upright spaced relation with each other and said rows being spaced laterally from each other to form magazine compartments between adjacent partition members, opposite faces of each pair of corresponding partition members in said rows, excepting the endmost pairs, forming boundaries for two adjacent compartments; support means provided on each of said pairs of partition members having a compartment disposed in advance thereof said support means supporting the elements deposited in said compartment and permitting the discharge from said compartment of the lowermost element therein; and means for gathering elements from lower ends of said compartments and assembling these in predetermined order.

23. In a machine for gathering groups of flat elements, the combination of a plurality of magazine partitions mounted in upright spaced relation with each other to form magazine compartments between adjacent partitions, opposite faces of each partition, excepting the endmost, forming boundaries for two adjacent compartments; support means provided on each of said partitions having a compartment disposed in advance thereof said support means supporting the elements deposited in said compartment and permitting the discharge from said compartment of the lowermost element therein, gauge means provided on each of said partitions disposed in advance of a magazine compartment said gauge means cooperating with the support means of said compartment to prevent the discharge from the latter of more than the lowermost element resting therein; and means for gathering elements from lower ends of said compartments and assembling these in predetermined order.

24. A combination as in claim 23, in which means is provided for adjusting the spaced relation between the support means and gauge means of each compartment so as to accommodate the discharge from said compartment of elements of different thickness.

25. A combination as in claim 23, in which means is provided for altering the position of said support means for each compartment to change the spacing between such support means and the gauge means for said compartment to accommodate the discharge from said compartment of elements of different thickness 26. In a machine for gathering groups of flat elements the combination of: a pair of parallel shafts or the like; a plurality of magazine partitions slidably supported on said shafts; means for adjustably fixing said partitions upon said shafts in proper positions to form a series of magazine compartments; means for supporting stacks of elements in said compartments; means for gathering elements from lower ends of said compartments and assembling these in predetermined order; and guide means for guiding the upper ends of said partitions in paths parallel to said shafts to substantially prevent the rotation of said partitions about said shafts while said partitions are being slid on said shafts.

27. A combination as in claim 26 in which means is provided for supporting said shafts and guide means to permit relative movement between the shaft and guide means on one side of said machine and the shaft and guide means on the other side of said machine to control the length of said compartments.

28. In a machine for gathering groups of flat elements the combination of: a pair of shafts or the like in spaced parallel relation; a series of brackets slidably mounted on each of said shafts and adapted to be adjustably secured on said shafts so that said brackets are disposed in pairs located at corresponding opposite points on said shafts; partition means provided on said brackets and extending inwardly from over said shafts, said partition means cooperating to provide a series of magazine compartments disposed transversely between said shafts; support means provided on said partition means and extending beneath said compartments to support elements stacked in said compartments; an end wall for each of said compartments; means for supporting said end wall on one of said brackets at one end of each of the aforesaid compartments; and means for gathering elements from lower ends of said compartments and assembling these in predetermined order.

29. In a machine for gathering groups of flat elements the combination of: two rows of partitions disposed upright and held in spaced relation to each other to form a series of magazine compartments, each aligned pair of partitions in said two rows forming a side wall for each of the two adjacent compartments on opposite sides of said pair of partitions, the vertical edges of said partitions in both of said rows, which edges face in a given direction, being beveled to facilitate the introduction of said elements horizontally into said compartments from said direction.

30. A combination as in claim 29 in which both inner and outer lateral edges of said partitions are beveled to facilitate the introduction of said elements horizontally into said compartments from either side of said machine.

31. A combination as in claim 29 in which both inner and outer lateral edges of said partitions are beveled to facilitate the introduction of said elements horizontally into said compartments from either side of said machine; end walls; and means for optionally mounting said end walls at either of the opposite ends of said compartments.

32. A combination as in claim 29 in which said partitions are of a hollow sheet metal construction.

33. In a machine for gathering groups of flat elements the combination of: a frame; a pair of transverse shafts supported on said frame; two pairs of bracket members slidably mounted on said shafts one of each of said pairs being on one of said shafts and the other of each of said pairs being on the other of said shafts, said bracket members being adapted to be fixed in various adjusted positions on said transverse shafts; a pair of longitudinal shafts one of which is supported between each of said pairs of bracket members; a series of magazine partitions mounted on each of said longitudinal shafts and adjustable longitudinally thereon to form a series of magazine compartments; means for supporting stacks of elements in said compartments to permit said stacks to be fed from the lower ends of said compartments one at a time; and means for gathering elements from the lower ends of said compartments and assembling these in predetermined order.

34. A combination as in claim 33 in which rods are provided on said bracket members for guiding said partitions when the latter are being adjusted on said longitudinal shafts.

35. In combination: a plurality of magazines for flat elements; a depository for groups of said elements; gathering mechanism for assembling groups of said elements from said magazines and depositing said groups in said depository; mechanism for dispensing said elements from said depository; and means for rendering said dispensing means inoperative upon the quantity of said elements in said depository being reduced by said dispensing means below a given minimum.

36. In combination: a plurality of magazines for flat elements; a depository for groups of said elements; gathering mechanism for assembling groups of said elements from said magazines and depositing said groups in said depository; mechanism for dispensing said elements from said depository; and means for rendering said gathering mechanism inoperative upon the quantity of said elements in said depository being increased above a given maximum.

37. In combination: a plurality of magazines for flat elements; a depository for groups of said elements; gathering mechanism for assembling groups of said elements from said magazines and depositing said groups in said depository; mechanism for dispensing said elements from said depository; means for rendering said gathering mechanism inoperative upon the quantity of said elements in said depository being increased above a given maximum; and means for rendering said dispensing means inoperative upon the quantity of said elements in said depository being reduced by said dispensing means below a given minimum.

GERALD C. PAXTON.
CHARLES H. JOHNSON.
ALBERT I. OBERMILLER.